(12) United States Patent
Dionisio

(10) Patent No.: US 11,825,990 B2
(45) Date of Patent: Nov. 28, 2023

(54) COFFEE GRINDING MACHINE WITH IMPROVED DOSING SYSTEM AND ASSOCIATED METHOD

(71) Applicant: LA MARZOCCO S.R.L., Scarperia (IT)

(72) Inventor: Andrea Dionisio, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 234 days.

(21) Appl. No.: 17/428,128

(22) PCT Filed: Feb. 5, 2020

(86) PCT No.: PCT/IB2020/050905
§ 371 (c)(1),
(2) Date: Aug. 3, 2021

(87) PCT Pub. No.: WO2020/161628
PCT Pub. Date: Aug. 13, 2020

(65) Prior Publication Data
US 2022/0047120 A1  Feb. 17, 2022

(30) Foreign Application Priority Data

Feb. 5, 2019  (IT) .................. 102019000001623

(51) Int. Cl.
*A47J 42/40* (2006.01)
*A47J 43/07* (2006.01)
*G01G 19/52* (2006.01)

(52) U.S. Cl.
CPC .............. *A47J 42/40* (2013.01); *A47J 43/07* (2013.01); *G01G 19/52* (2013.01); *A47J 2043/0733* (2013.01)

(58) Field of Classification Search
CPC .. A47J 42/38; A47J 42/40; A47J 42/46; A47J 2043/0733
See application file for complete search history.

(56) References Cited

U.S. PATENT DOCUMENTS 4,967,648 A    11/1990 Helbling
5,133,983 A     7/1992 Greiwe
(Continued)

FOREIGN PATENT DOCUMENTS

AU    2015100960    9/2015
CA    2962617 A1   4/2016
(Continued)

OTHER PUBLICATIONS

Principles of Operation—AC VFD Drives, retrieved date May 15, 2023; https://natural-resources.canada.ca/energy-efficiency/energy-star-canada/about/energy-star-announcements/publications/variable-frequency-drives/principles-operation-ac-vfd-drives/15433.*
(Continued)

*Primary Examiner* — Matthew Katcoff
*Assistant Examiner* — Mohammed S. Alawadi
(74) *Attorney, Agent, or Firm* — NIXON & VANDERHYE P.C.

(57) ABSTRACT

A coffee grinding machine is described, said machine comprising a first grinder and a second grinder cooperating with each other based on a first grinding parameter for grinding coffee beans, thus obtaining a first dose of ground coffee during a first grinding cycle, wherein the coffee grinding machine also comprises a weighing device configured to measure the weight of said first dose of coffee substantially at the end of said first grinding cycle, wherein said weight measurement of said first dose measured at the end of said first grinding cycle is used to set a second grinding parameter of a second dose, ground after the first dose during a (Continued)

second grinding cycle. The coffee grinding machine is configured to interrupt the grinding of said second dose during said second grinding cycle in a manner not dependent on an actual weight measurement of said second dose.

11 Claims, 3 Drawing Sheets

(56) References Cited

U.S. PATENT DOCUMENTS

| | | |
|---|---|---|
| 5,239,519 A | 8/1993 | Nelson |
| 5,259,297 A | 11/1993 | Guiliano |
| 5,372,061 A | 12/1994 | Albert |
| 5,462,236 A | 10/1995 | Knepler |
| 5,555,791 A | 9/1996 | McNeill et al. |
| 5,870,943 A | 2/1999 | Levi |
| 6,058,986 A | 5/2000 | Bethuy |
| 6,067,894 A | 5/2000 | Eugster |
| 6,085,637 A | 7/2000 | Fukushima |
| 6,155,158 A | 12/2000 | Anson |
| 6,459,854 B1 | 10/2002 | Yoakim et al. |
| 6,550,370 B2 | 4/2003 | Dam |
| 6,611,660 B1 | 8/2003 | Sagal |
| 7,461,585 B2 | 12/2008 | Nenov |
| 8,215,229 B2 | 7/2012 | Faccinti |
| 8,272,319 B2 | 9/2012 | Jarisch |
| 8,663,724 B1 | 3/2014 | Banasik |
| 8,696,899 B2 | 4/2014 | Roulin |
| 8,850,956 B2 | 10/2014 | Bianchi et al. |
| 8,850,959 B2 | 10/2014 | Bianchi et al. |
| 8,857,318 B2 | 10/2014 | Zhong |
| 8,895,095 B2 | 11/2014 | Star et al. |
| 9,125,519 B2 | 9/2015 | Goeltenboth et al. |
| 9,578,986 B2 | 2/2017 | Ceotto et al. |
| 9,986,870 B2 | 6/2018 | Reyhanloo |
| 10,602,874 B2 | 3/2020 | Cable |
| 10,687,660 B2 | 6/2020 | Gatti et al. |
| 10,881,242 B2 | 1/2021 | Dionisio et al. |
| 11,103,104 B2 | 8/2021 | Bakke et al. |
| 11,122,927 B2 | 9/2021 | Bianchi et al. |
| 2004/0079237 A1 | 4/2004 | Denisart |
| 2004/0244599 A1 | 12/2004 | Wei |
| 2005/0011364 A1 | 1/2005 | Chen et al. |
| 2006/0037481 A1 | 2/2006 | Bicht |
| 2006/0150821 A1 | 7/2006 | Paul |
| 2006/0278093 A1 | 12/2006 | Biderman et al. |
| 2006/0283329 A1 | 12/2006 | Ronci |
| 2007/0051247 A1 | 3/2007 | Felty |
| 2007/0193452 A1 | 8/2007 | Campetella et al. |
| 2007/0227363 A1 | 10/2007 | Verna |
| 2007/0277676 A1 | 12/2007 | Crivellin |
| 2008/0190297 A1 | 8/2008 | Gussmann |
| 2009/0095165 A1 | 4/2009 | Nosler |
| 2009/0114099 A1 | 5/2009 | Gotlenboth |
| 2009/0205502 A1 | 8/2009 | Carbonini |
| 2010/0005971 A1 | 1/2010 | Faccinti |
| 2010/0018407 A1 | 1/2010 | Liu |
| 2010/0030222 A1 | 1/2010 | Rehanloo |
| 2010/0095852 A1* | 4/2010 | Remo .............. A47J 31/42 99/287 |
| 2010/0112165 A1 | 5/2010 | Masciandaro |
| 2010/0229728 A1 | 9/2010 | Kiefer et al. |
| 2010/0233337 A1 | 9/2010 | Aigner |
| 2010/0263543 A1 | 10/2010 | Krauchi |
| 2010/0282090 A1 | 11/2010 | Etter |
| 2010/0300299 A1 | 12/2010 | Epars et al. |
| 2011/0005398 A1 | 1/2011 | Garcia |
| 2011/0042408 A1 | 2/2011 | Giordano |
| 2011/0048243 A1 | 3/2011 | Bambi |
| 2011/0117259 A1 | 5/2011 | Storek |
| 2012/0017767 A1 | 1/2012 | Samso Besora |
| 2012/0090474 A1 | 4/2012 | Carbonini |
| 2012/0118164 A1 | 5/2012 | Tonelli et al. |
| 2012/0121780 A1 | 5/2012 | Lai et al. |
| 2012/0171332 A1 | 7/2012 | Lai |
| 2012/0222666 A1 | 9/2012 | Morgandi |
| 2013/0098249 A1 | 4/2013 | Fidler et al. |
| 2013/0330453 A1 | 12/2013 | Majer |
| 2014/0137746 A1 | 5/2014 | Moran et al. |
| 2014/0314921 A1 | 10/2014 | Kuempel et al. |
| 2014/0352543 A1 | 12/2014 | Boni |
| 2016/0220067 A1* | 8/2016 | Teahan .............. A47J 42/46 |
| 2016/0249763 A1 | 9/2016 | Llopis |
| 2017/0119195 A1 | 5/2017 | Al-Sahibani |
| 2018/0055275 A1 | 3/2018 | Bianchi et al. |
| 2018/0153332 A1* | 6/2018 | Abbiati .............. A47J 42/40 |
| 2018/0271319 A1 | 9/2018 | Gatti et al. |
| 2018/0279831 A1* | 10/2018 | Ottavi .............. A47J 42/38 |
| 2018/0303284 A1 | 10/2018 | Gatti et al. |
| 2018/0360257 A1 | 12/2018 | Dionisio et al. |
| 2019/0075964 A1 | 3/2019 | Della Pietra et al. |
| 2020/0093323 A1 | 3/2020 | Dionisio et al. |
| 2020/2371371 | 7/2020 | Bakke et al. |
| 2021/0204748 A1 | 7/2021 | Della Pietra et al. |
| 2022/0000314 A1* | 1/2022 | Pachi .............. A47J 42/44 |

FOREIGN PATENT DOCUMENTS

| | | |
|---|---|---|
| CN | 1424886 A | 6/2003 |
| CN | 101229019 A | 7/2008 |
| CN | 101600377 A | 12/2009 |
| CN | 100588354 C | 2/2010 |
| CN | 201401779 Y | 2/2010 |
| CN | 202179442 U | 4/2012 |
| CN | 102595984 A | 7/2012 |
| CN | 102761565 | 10/2012 |
| CN | 103118574 A | 5/2013 |
| CN | 203 122 128 | 8/2013 |
| CN | 103391734 A | 11/2013 |
| CN | 104080379 A | 10/2014 |
| CN | 104619218 A | 5/2015 |
| CN | 105640339 A | 6/2016 |
| CN | 106073509 A | 11/2016 |
| DE | 29 19 110 | 11/1980 |
| DE | 10 2011 116 913 A1 | 9/2012 |
| DE | 10 2013 107077 | 1/2015 |
| EP | 0 838 185 | 4/1998 |
| EP | 1 034 729 | 9/2000 |
| EP | 1 688 072 B1 | 8/2006 |
| EP | 1 747 736 | 1/2007 |
| EP | 1 886 604 A1 | 2/2008 |
| EP | 2 218 374 A2 | 8/2010 |
| EP | 2 314 182 | 4/2011 |
| EP | 2 316 796 | 5/2011 |
| EP | 2 490 580 | 8/2012 |
| EP | 2 490 578 | 9/2013 |
| EP | 2 644 066 | 10/2013 |
| EP | 2 701 563 | 3/2014 |
| EP | 2 789 276 | 10/2014 |
| EP | 3 042 591 | 7/2016 |
| EP | 3 064 099 | 9/2016 |
| EP | 3 167 782 | 5/2017 |
| EP | 3 225 141 | 10/2017 |
| EP | 3 329 815 | 6/2018 |
| FR | 1 174 038 | 3/1959 |
| FR | 1 449 310 | 8/1966 |
| FR | 2 901 681 | 12/2007 |
| GB | 726 272 | 3/1955 |
| GB | 728 476 | 4/1955 |
| JP | 2004-534562 A | 11/2004 |
| JP | 2005-040605 A | 2/2005 |
| JP | 2009-537260 A | 10/2009 |
| JP | 2012-035040 A | 2/2012 |
| JP | 2014-506820 A | 3/2014 |
| JP | 2015-518381 A | 7/2015 |
| JP | 2015-144714 A | 8/2015 |
| WO | WO 2006/082064 | 8/2006 |
| WO | 1 898 758 B1 | 11/2006 |
| WO | WO 2008/114210 | 9/2008 |
| WO | WO 2009/010190 | 1/2009 |
| WO | WO 2010/113116 | 10/2010 |
| WO | WO 2011/055189 | 5/2011 |
| WO | WO 2011/095926 | 8/2011 |

(56) References Cited

FOREIGN PATENT DOCUMENTS

| WO | WO 2011/140582 | | 11/2011 |
|---|---|---|---|
| WO | 2012/138327 | | 10/2012 |
| WO | WO 2012/138327 | A1 | 10/2012 |
| WO | WO 2012/146641 | A1 | 11/2012 |
| WO | WO 2013/112732 | | 8/2013 |
| WO | WO 2013/121438 | | 8/2013 |
| WO | WO 2014/177925 | | 11/2014 |
| WO | WO 2014/187110 | A1 | 11/2014 |
| WO | WO 2014/207281 | | 12/2014 |
| WO | WO 2015/006244 | A1 | 1/2015 |
| WO | WO 2015/055342 | A1 | 4/2015 |
| WO | WO 2015/055557 | | 4/2015 |
| WO | WO 2016/057568 | | 4/2016 |
| WO | WO 2016/093920 | | 6/2016 |
| WO | WO 2017/009186 | | 1/2017 |
| WO | WO 2017/009189 | | 1/2017 |
| WO | WO 2017/068021 | | 4/2017 |
| WO | WO 2018/115876 | | 6/2018 |
| WO | WO 2018/219878 | | 12/2018 |

OTHER PUBLICATIONS

International Search Report for PCT/IB2020/050905 dated Aug. 4, 2020, 3 pages.
Written Opinion of the ISA for PCT/IB2020/050905 dated Aug. 4, 2020, 5 pages.
U.S. Appl. No. 17/289,093, filed Apr. 27, 2021, entitled "Espresso Coffee Machine With Adjustment of the Dispensing Pressure and Method for Adjusting the Dispensing Pressure of an Espresso Coffee Machine".
U.S. Appl. No. 17/286,133, filed Apr. 16, 2021, entitled "Active System for Monitoring and Filtering the Water for an Espresso Coffee Machine and Associated Espresso Coffee Machine".
U.S. Appl. No. 17/421,548, filed Jul. 8, 2021, entitled "Coffee Grinding Machine Configured To Provide a Dose of Stratified Ground Coffee and Associated Method".
U.S. Appl. No. 17/422,904, filed Jul. 14, 2021, entitled "Ultrasonic Cleaner Device for an Espresso Coffee Machine and Espresso Coffee Machine Incorporating Such a Cleaner Device".
U.S. Appl. No. 17/428,181, filed Aug. 3, 2021, entitled "Coffee Grinding Machine Configured To Provide Different Particle Size Profiles and Associated Method".
International Search Report for PCT/EP2016/066181, dated Oct. 5, 2016, 3 pages.
International Search Report for PCT/EP2016/074726, dated Jan. 31, 2017, 2 pages.
International Search Report for PCT/EP2016/075182 dated Feb. 23, 2017, 4 pages.
Written Opinion of the ISA for PCT/EP2016/075182 dated Feb. 23, 2017, 5 pages.
English Translation for CN 102761565 published Oct. 2012.
English translation of JP Office Action dated Jun. 8, 2021 in JP application 2018-517145.
U.S. Pat. No. 6,164,189, Dec. 200, Anson.
International Search Report for PCT/EP2016/066186, dated Aug. 12, 2016, 3 pages.
Office Action dated Dec. 10, 2019 in U.S. Appl. No. 15/739,856.
International Search Report for PCT/EP2017/052213, dated May 4, 2017, 3 pages.
International Search Report and Written Opinion dated Jun. 9, 2016, issued in PCT/EP2016/053894.
International Search Report for PCT/IB2018/051865, dated Jul. 2, 2018, 3 pages.
Written Opinion of the ISA for PCT/IB2018/051865, dated Jul. 2, 2018, 5 pages.
Chinese Office Action and English translation dated Mar. 31, 2021 in Chinese Application 201880018668.5.
Yingile et al, "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/EP2019/079672 dated Dec. 18, 2019, 3 pages.
Written Opinion of the ISA for PCT/EP2019/079672 dated Dec. 18, 2019, 5 pages.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion dated Jun. 15, 2015, issued in corresponding International Application PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.
International Search Report for PCT/IB2019/054750, dated Aug. 13, 2019, 4 pages.
Written Opinion of the ISA for PCT/IB/2019/057750, dated Aug. 13, 2019, 5 pages.
International Search Report for PCT/EP2020/051464, dated Apr. 21, 2020, 4 pages.
Written Opinion of the ISA for PCT/EP2020/051464, dated Apr. 21, 2020, 6 pages.
International Search Report for PCT/EP2019/080559, dated Feb. 11, 2020, 5 pages.
Written Opinion of the ISA for PCT/EP2019/080559, dated Feb. 11, 2020, 5 pages.
International Search Report for PCT/IB2020/050907 dated Apr. 6, 2020, 4 pages.
Written Opinion of the ISA for PCT/IB2020/050907 dated Apr. 6, 2020, 6 pages.

* cited by examiner

COFFEE GRINDING MACHINE WITH IMPROVED DOSING SYSTEM AND ASSOCIATED METHOD

This application is the U.S. national phase of International Application No. PCT/IB2020/050905 filed Feb. 5, 2020 which designated the U.S. and claims priority to IT Patent Application No. 102019000001623 filed Feb. 5, 2019, the entire contents of each of which are hereby incorporated by reference.

BACKGROUND

The present invention relates to a machine for grinding coffee beans. The machine for grinding coffee beans may be a separate machine or may be incorporated in a machine for the production of coffee-based beverages. Such a machine for grinding coffee beans is also known simply as a "coffee grinding machine", "coffee grinder" or "mill".

BACKGROUND ART

As is known, for the preparation of an espresso coffee, a certain quantity of ground coffee, usually referred to as "dose", is used. The dose of ground coffee is loaded into a filter, typically in the form of a cup which is open at the top and which has a bottom with micro-perforations. Typically the dose of coffee is pressed inside the filter to form a puck of coffee powder. The filter is in turn supported by a portafilter configured to engage removably inside a dispensing unit of an espresso coffee machine. The espresso coffee is obtained by passing hot water under pressure through the puck of coffee powder.

The dose of coffee is typically established in terms of weight, typically as grams. During the practical running of a bar, the barista normally tries, where possible, to fill the portafilter always with the same amount (weight) of coffee (for example 14 g).

The coffee powder is obtained with a coffee grinding machine. In a known coffee grinding machine the coffee beans are ground by passing them through grinding members. Grinding members of the flat, conical or cylindrical type are known. Typically, the grinding members of a coffee grinding machine comprise a stationary member and a member rotating relative to the stationary member. For example, in a coffee grinder with conical grinders, one grinder is immobile and stationary, while the other grinder is rotated by a motor. Some coffee grinding machines are able to modify the distance between the grinders in order to vary the particle size of the coffee powder.

Various dosing devices are known, these being able to be classified basically as dosing devices which define a dose of coffee beans (before they are ground) and devices which define a dose of coffee powder. In particular, the devices of the second type may perform dosing based on time, dosing based on the number of revolutions, dosing based on the volume and dosing based on the weight/mass of the coffee powder.

WO 2012/138327 A1 describes a process and an apparatus for grinding and dosing coffee beans with automatic and continuous calibration of the dose.

SUMMARY OF THE INVENTION

The time-based dosing devices are considered to be imprecise since the coffee grinding machine does not control the dose of ground coffee powder, but only the grinding time. At the most, the time-based measuring devices are considered to be able to generate a substantially constant (repeatable) dose. In the case of a coffee grinding machine able to provide highly repeatable doses it is possible to associate with each grinding time a corresponding dose, determined using scales external to the system. For example, it could be concluded that a coffee grinding machine supplies 14 g of coffee powder in 5 seconds.

The estimate as to the dose of ground coffee is therefore indirect. In fact, the coffee grinding machine controls the time and it is assumed that constant doses correspond to constant times (and to fixed settings). Obviously, when there is a change in the type of coffee, in the particle size and in the environmental conditions, the relationship between time and dose will change.

Dosing based on the number of revolutions also constitutes an indirect estimate of the dose. Essentially, the grinding members do not rotate for a set time, but perform a number of revolutions which can be set. The coffee grinding machine controls the number of revolutions and it is assumed that constant doses correspond to a constant number of revolutions (and to fixed settings). Obviously, when there is a change in the type of coffee, the particle size and the environmental conditions, the relationship between number of revolutions and dose will change.

In dosing systems based on the volume, the coffee grinding machine is able to measure the volume of ground coffee produced. In this case also, the barista is required to determine by means of trial-and-error a relationship between the weight and volume of ground coffee.

The weight-based dosing system is a direct system. Essentially, a set of scales connected to the coffee grinding machine weighs in real time the ground coffee while it is supplied and interrupts the dosing when it reaches the desired weight. In some machines, as one gets close to achieving the desired weight of ground coffee, the coffee grinding machine slows down the speed in order to reach the dose in the most precise manner possible.

The Applicant has defined the aim of improving the known weight-based dosing systems.

In particular, the Applicant has noted that the aforementioned known weight-based dosing systems are slow since the motor of a coffee grinding machine is unable to rotate at a constant speed for the entire duration of grinding, but slows down during the last part of the grinding process in order to achieve the weight of the dose in the most precise manner possible.

Moreover, the known weight-based dosing systems are very sensitive for the whole duration of the grinding process. It often happens that a barista may accidentally knock the scales during grinding. This accidental knock generates an incorrect weight signal which interrupts the grinding before the desired weight is reached or prolongs grinding beyond the set time. In the first case the dose is smaller in volume, while in the second case the dose is much greater. If the barista does not realize that the weight of the dose has been accidentally changed, an espresso coffee with the wrong dose (smaller amount of ground coffee or higher amount of ground coffee) will be prepared, resulting in a beverage different from that which would have been obtained with the correct dose. If the barista notices the error, the dose must be adjusted manually or the incorrect dose thrown away and grinding repeated.

Moreover, because of the aforementioned sensitive nature of the scales, the barista is unable to move the portafilter during grinding. Many baristas, on the contrary, tend to move the portafilter during grinding in order to "mix" the ground coffee inside the portafilter.

The Applicant has defined the aim of providing a coffee grinding machine configured to provide doses of coffee powder in an efficient, fast and stable manner compared to the known systems.

According to the present invention, a weighing device for weighing the dose of ground coffee only at the end of a grinding cycle is provided. The measured weight value is used to program the next dose.

Preferably, grinding is performed with a constant speed of rotation of the grinding members.

Grinding is performed by keeping constant the number of revolutions or, alternatively, the grinding time.

According to a first aspect a coffee grinding machine comprising a first grinder and a second grinder is provided.
   wherein at least one of the first and second grinders is movable,
   wherein said grinders cooperate with each other based on a first grinding parameter (for example a certain number of revolutions or a certain grinding time) so as to grind coffee beans, thus obtaining a first dose of ground coffee during a first grinding cycle,
   wherein said coffee grinding machine comprises a motor which is configured to rotate said second grinder with respect to the first grinder,
   wherein said coffee grinding machine also comprises a weighing device configured to measure the weight of said first dose of coffee substantially at the end of said first grinding cycle,
   wherein said weight measurement of said first dose measured at the end of said first grinding cycle is used to set a second parameter for grinding a second dose, which is ground after the first dose during a second grinding cycle, and
   wherein said coffee grinding machine is configured to interrupt the grinding of said second dose during said second grinding cycle in a manner not dependent on an actual weight measurement of said second dose.

The first grinding parameter may be a certain number of revolutions of the motor and/or a certain grinding time. Advantageously, the coffee grinding machine does not interrupt the grinding of the second dose when a certain (set) weight of the second dose is reached, but only depending on the second grinding parameter which has been set. The weight of the second dose is measured substantially at the end of the second grinding cycle so as to set a third parameter for grinding a third dose, ground after the second dose during a third grinding cycle.

One advantage, among others, is that the processing required is less than that in the known machines because the weight of the dose is not measured continuously and is not continuously compared with a desired weight, but the comparison is performed only when the dose has been ground and the grinders are at a standstill. The precision is also better because in the other known machines grinding is interrupted when the weight reached is equal to that set, without taking into account that in any case typically some ground powder still falls immediately before stopping the motor.

Preferably, the motor is configured to rotate said second grinder at a substantially constant speed.

According to embodiments, the second grinding parameter is a number of revolutions of the motor necessary for performing grinding of said second dose. Therefore, grinding of the second dose is interrupted after the set number of revolutions, which in turn depends on the measured weight of the first dose, at the end of the first grinding process.

According to embodiments, the second grinding parameter is a grinding time necessary for performing grinding of said second dose. Therefore, grinding of the second dose is interrupted after the set time, which in turn depends on the measured weight of the first dose, at the end of the first grinding process.

The machine may also comprise a frequency variator device for controlling the speed of rotation of the motor.

The machine may also comprise an angular position transducer, associated with the electric motor for measuring the rotation speed of the electric motor.

According to embodiments, the weighing device is separate from the machine body of said coffee grinding machine.

According to embodiments, a method for grinding coffee beans between at least a first grinder and a second grinder is provided, wherein at least one of the first and second grinders is movable, wherein said grinders cooperate with each other so as to grind coffee beans, thus obtaining a first dose of ground coffee during a first grinding cycle, the method comprising:
   rotating said second grinder with respect to the first grinder with a first grinding parameter,
   measuring the weight of said first dose of coffee substantially at the end of said first grinding cycle,
   setting a second grinding parameter of a second dose, to be ground after the first dose during a second grinding cycle, based on said weight measurement of said first dose measured at the end of said first grinding cycle, and
   interrupting the grinding of said second dose during said second grinding cycle in a manner not dependent on an actual weight measurement of said second dose.

According to embodiments, the step of moving at least one of the grinders with respect to the other one comprises the step of rotating the second grinder at a substantially constant speed.

The second grinding parameter may be a certain number of grinding revolutions. In this case, the second grinder is rotated for said number of revolutions which is related to the weight of said first dose of coffee.

The second parameter may be a time. In this case, the second grinder is rotated for said time which is related to the weight of said first dose of coffee.

BRIEF DESCRIPTION OF THE DRAWINGS

There now follows a detailed description of the invention, provided by way of a non-limiting example, to be read with reference to the attached drawings, in which.

DETAILED DESCRIPTION

Figure 1:
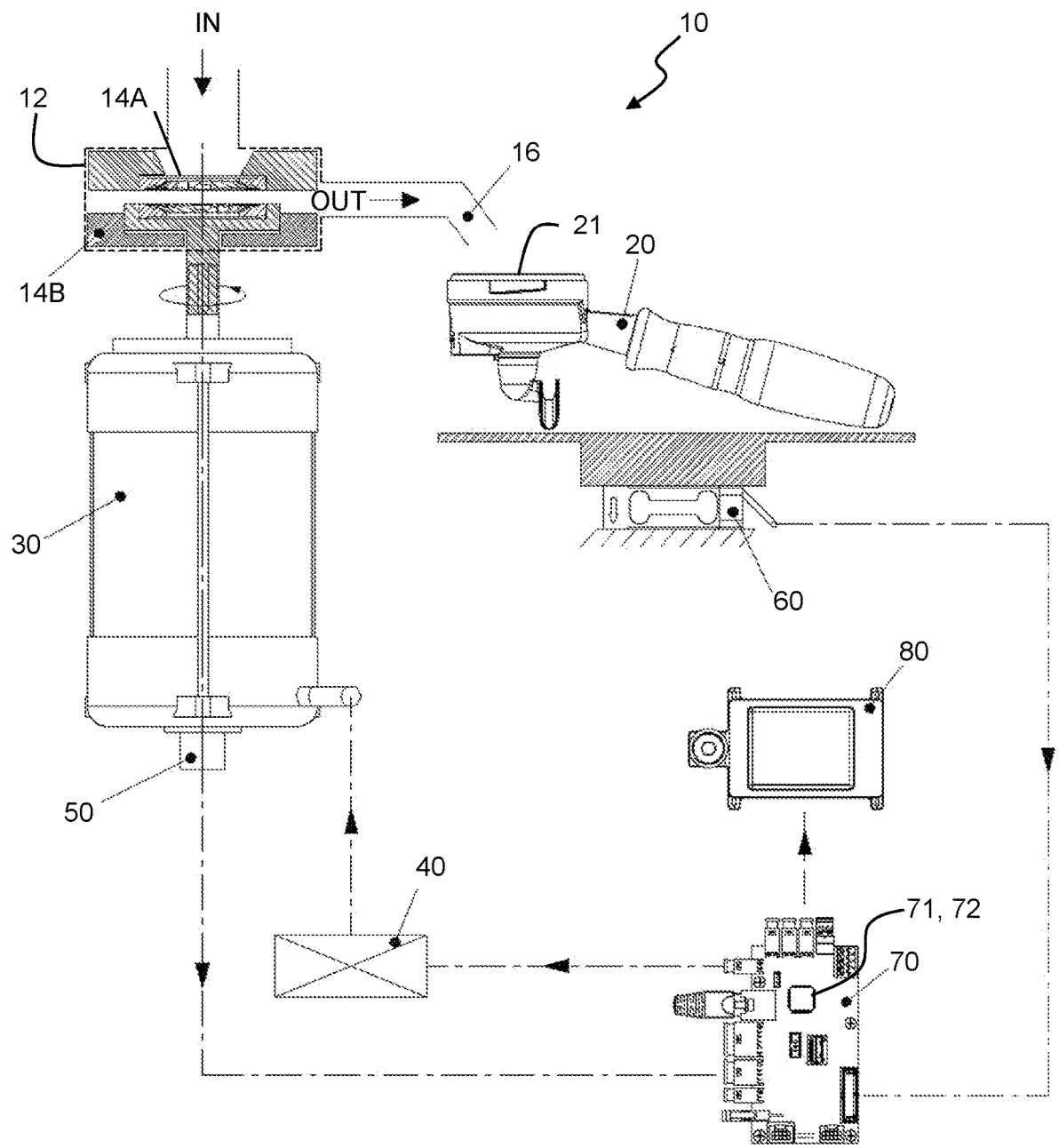
FIG. 1 is a diagram of certain components of the coffee grinding machine according to an embodiment of the present invention.

FIG. 1 shows, purely by way of example, a coffee grinding machine according to an embodiment of the present invention. For the sake of simplicity only the components of the machine which are relevant for the purposes of the present invention are described. Other components, which are not relevant, will not be described in detail. The machine described comprises flat grinders, but the present invention is also applicable to machines with other types of grinders, such as conical or cylindrical grinders.

The machine 10 comprises a grinding chamber 12 with an upper inlet IN for the coffee to be ground, a first grinder 14A and a second grinder 14B cooperating with the first grinder 14A and an outlet conveyor 16 which receives the ground coffee from the grinders 14A and 14B and conveys it so as to be collected and used. For example, as shown in FIG. 1, the ground coffee may be conveyed towards a filter 91 supported by a portafilter 20 of any known type.

According to the embodiment of FIG. 1, the first grinder 14A is a stationary grinder while the second grinder 14B is movable, for example rotatable.

The coffee grinding machine comprises an electric motor 30 for rotating the second grinder 14B. In embodiments, the motor may be a universal, DC, AC, single-phase, three-phase, brushless, BLDC, stepper or similar motor.

Preferably, the coffee grinding machine also comprises a frequency variator device 40 for controlling the rotation speed. For example, this frequency variator device comprises an inverter. This frequency variator device 40 is able to vary the grinding speed so as to allow uniform grinding at a first speed or at a second speed.

According to embodiments, the coffee grinding machine also comprises an angular position transducer, for example an encoder 50, associated with the electric motor for measuring in a precise manner the rotation speed of the motor 30.

According to the present invention, the coffee grinding machine 10 further comprises a weighing device 60 for measuring the weight (or mass) of a dose of coffee powder. According to embodiments, the weighing device is configured to weigh the dose of coffee powder inside the filter 21. Preferably, the weighing device 60 is configured to weigh the dose of coffee powder inside the filter 21 arranged in the portafilter 20.

According to the present invention, the coffee grinding machine 10 further comprises a processor 70 and a memory 71, preferably on an electronic board 72 or the like.

According to the present invention, the coffee grinding machine 10 further comprises a user interface 80, in turn preferably comprising a display and selection means, for example one or more buttons. Preferably, the user interface 80 is connected (directly or indirectly) to the processor 70.

Figure 2:
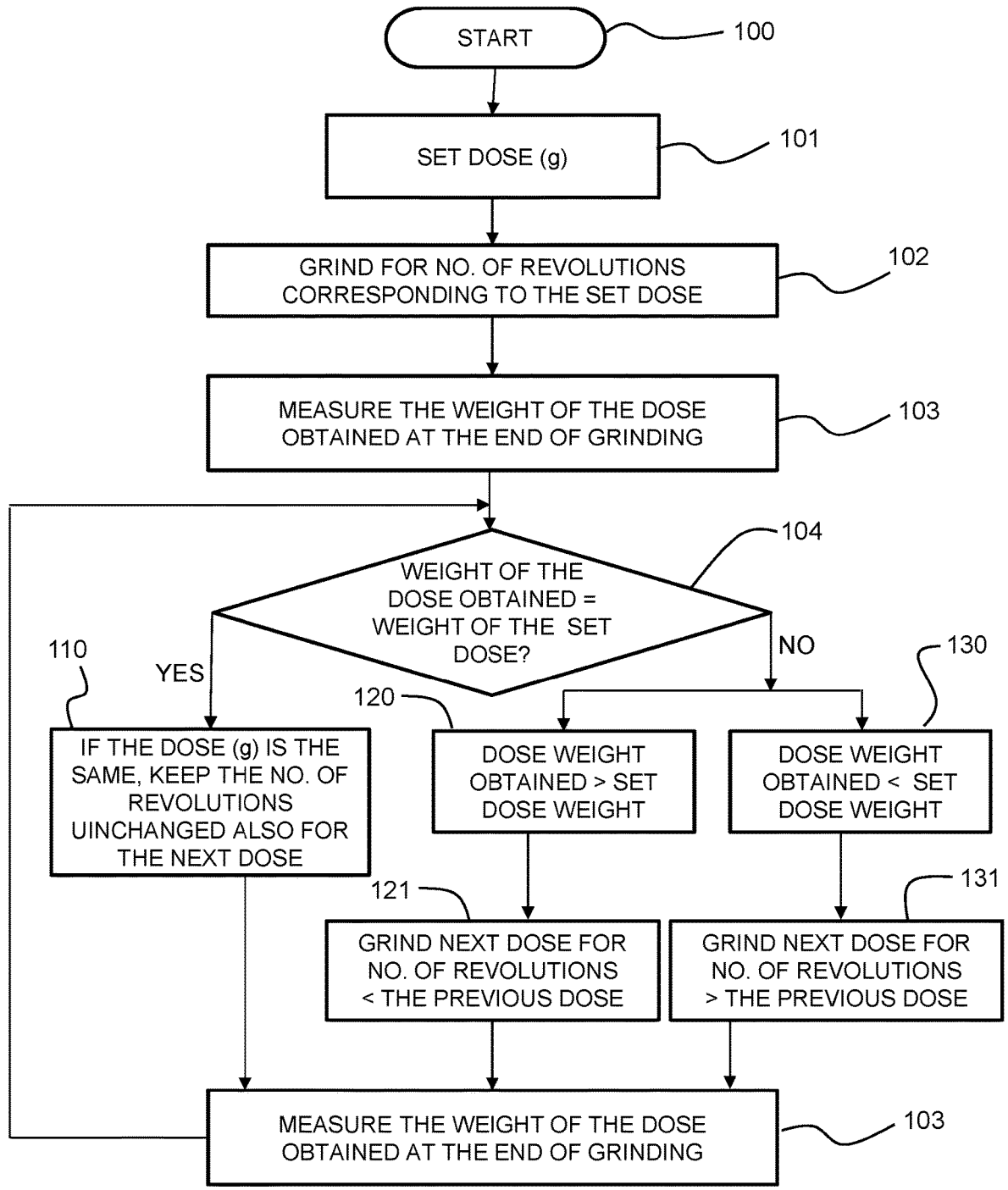
FIG. 2 is a flow diagram which summarizes the main steps of the method according to an embodiment of the present invention.

With reference now to FIG. 2, the improved method for obtaining a dose of coffee will now be described.

As a first step (101), a desired dose of coffee is set. Typically, the desired dose is expressed in units of weight, for example grams. The setting of the desired dose may be performed by the barista by pressing a button corresponding to the desired dose or may be performed by the barista by keying in the numbers corresponding to the desired weight or may be achieved by pressing the special buttons so to increase or decrease the setting until the weight value of the desired dose is achieved. The setting operation could also be performed by means of voice commands or in any other way. In embodiments, the setting of the desired dose could be performed by means of a separate device connected to the coffee grinding machine. For example, by means of a tablet or smartphone belonging to the barista or the person for whom the barista must prepare the espresso coffee.

Merely by way of example and solely for the purposes of providing a context for the present description, the set dose may be 14 g.

After setting the dose, the coffee grinding machine 10 is started.

Obviously, before starting the coffee grinding machine, the filter 21 inside which the coffee powder obtained from grinding is collected is positioned under the outlet for the ground coffee. Preferably, the filter 21 is placed inside the portafilter 20. Preferably the portafilter and the filter are suitably supported by the weighing device 60. It is preferably envisaged that the weighing device 60 is able to calculate the weight of the portafilter 20 and the empty filter (tare weight) and zeroes the measured value so that the weighing device 60 may measure more easily the weight of the dose of ground coffee.

According to the first embodiment, the machine 10 is programmed to grind at a constant number of revolutions (step 102). Namely, the grinders are rotated always by the same amount. This is possible owing to the aforementioned speed sensor 50.

At the end of the predefined number of revolutions, corresponding to the set weight of the dose, the motor 30 stops and grinding is stopped.

Once grinding has terminated, the weighing device 60 weighs the dose of ground coffee (step 103). The weighing of the ground coffee is performed only at the end of the grinding. In any case, even if the weighing device were to weigh the ground coffee continuously, or discontinuously, during grinding, according to the present invention, the weight values of the ground coffee before the end of grinding would not be taken into consideration.

According to the present invention, the coffee grinding machine is configured to compare the weight of the dose obtained with the weight of the set dose (step 104).

If the dose of ground coffee obtained has a weight equal to the set weight of ground coffee (plus or minus a margin of error considered acceptable), the next dose will be obtained by keeping the number of revolutions unchanged (step 110). Namely, if the barista wishes to obtain a next dose the same as that just ground, her/she will keep the number revolutions unchanged. If the barista wishes to have a larger or smaller dose, the number of revolutions would be adjusted with respect to the number of revolutions corresponding to the dose just obtained. Obviously, at the end of each grinding operation, the weight of the dose obtained must be measured again (step 103) and compared again with the weight of the desired dose (104).

If the dose of ground coffee obtained has a weight greater than the set dose of ground coffee (120), the next dose will be obtained by suitably reducing the number of revolutions (step 121). Preferably, at the end of each grinding operation, the weight of the dose obtained must be measured again (step 103) and compared again with the weight of the desired dose (104).

If the dose of ground coffee obtained has a weight less than that of the set dose of ground coffee (130), the next dose will be obtained by suitably increasing the number of revolutions (step 131). Preferably, at the end of each grinding step, the weight of the dose obtained must be measured again (step 103) and compared again with the weight of the desired dose (104).

In any case, the weight of one dose at the end of grinding is used to set the revolutions for obtaining the next dose. The machine checks the weight and corrects the number of rotations continuously, after each grinding operation.

The weight of one dose, differently from that which occurs in known coffee grinding machines, is not used to stop the grinding process, but to obtain a following dose having a weight corresponding to the set dose.

Preferably, the coffee grinding machine comprises a memory with a relationship between weight of the dose and the number of revolutions. By way of example, the memory could contain information as shown in Table 1 below.

TABLE 1

| Default number of revolutions | Weight (g) of the dose |
|---|---|
| 3.50 | 4-6 |
| 4.20 | 6-8 |
| 4.90 | 8-10 |
| 5.60 | 10-12 |
| 6.30 | 12-14 |
| 7.00 | 14-16 |
| 7.70 | 16-18 |
| 8.40 | 18-20 |
| 9.10 | 20-22 |

If the coffee grinding machine is switched off, during the next start-up it will start from the last value used (e.g. 7.00 revolutions if a dose of 14 g was set).

Figure 3:
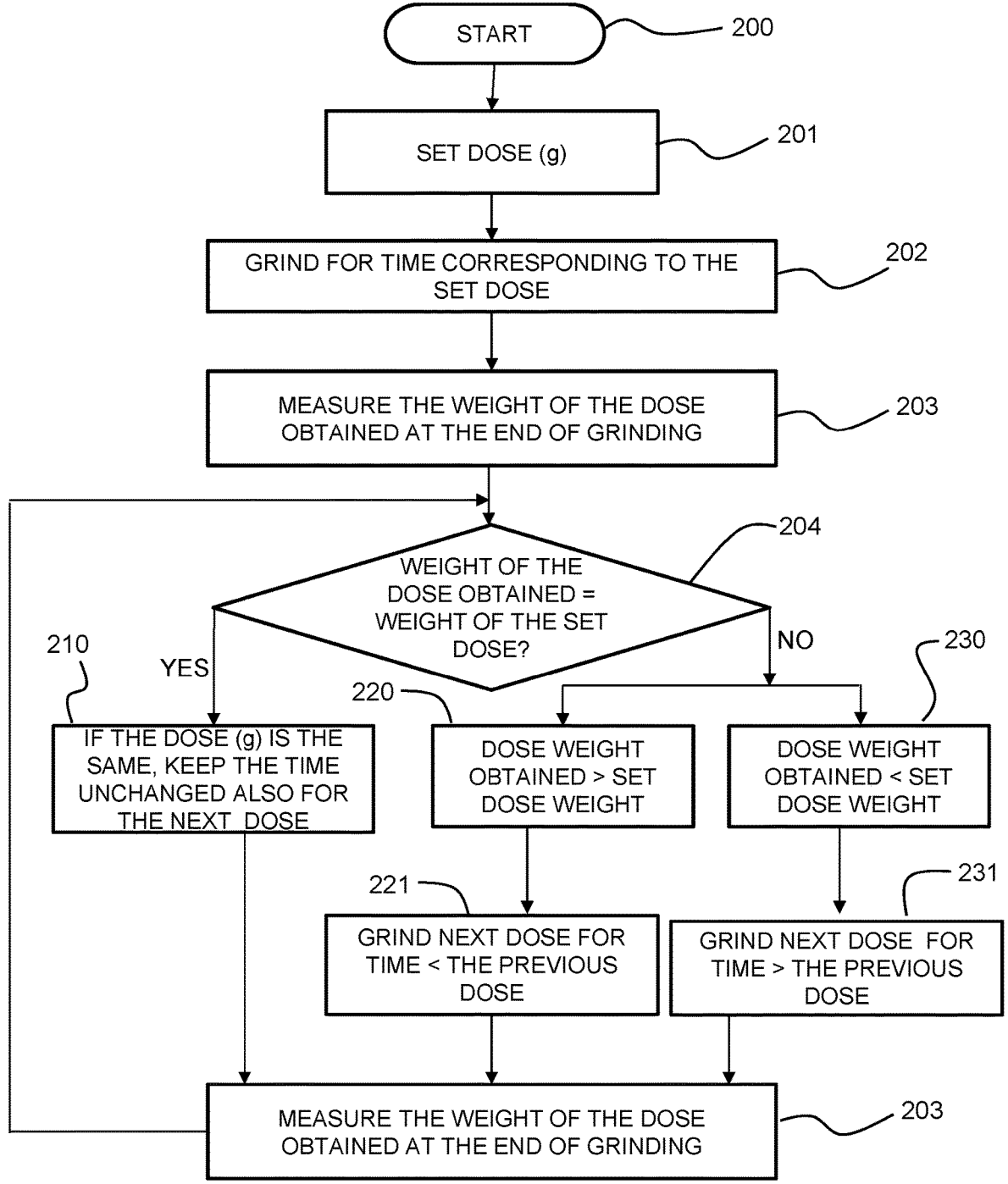
FIG. 3 is a flow diagram representing an alternative to that shown in FIG. 2.

FIG. 3 shows a flow diagram which illustrates an alternative method to that shown in FIG. 2. Differently from the method shown in FIG. 2 (based on a relationship between weight of the dose and number of revolutions), the method according to FIG. 3 is based on a relationship between weight of the dose and grinding time.

The setting of the dose may be performed as described in detail with reference to FIG. 2.

As indicated in step 202, according to the second embodiment, the machine is programmed to grind for a constant period of time. That is, the grinders are rotated for a predetermined time, corresponding to the default weight of the dose. Preferably a timer, preferably associated with the board 70, is provided.

At the end of the predefined time, corresponding to the set weight of the dose, the motor 30 stops and grinding is stopped.

Once grinding has terminated, the weighing device 60 weighs the dose of ground coffee (step 203). The weighing of the ground coffee is performed only at the end of the grinding. In any case, even if the weighing device were to weigh the ground coffee continuously, or discontinuously, during grinding, according to the present invention, the weight values of the ground coffee before the end of grinding would not be taken into consideration.

According to the present invention, the coffee grinding machine is configured to compare the weight of the dose obtained with the weight of the set dose (step 204).

If the dose of ground coffee obtained has a weight the same as the set weight of ground coffee (plus or minus a margin of error considered acceptable), the next dose will be obtained by keeping the grinding time unchanged (step 210). Namely, if the barista wishes to obtain a next dose the same as that just ground (plus or minus a margin of error considered acceptable), the number of revolutions will be kept unchanged. If the barista wishes to have a larger or smaller dose, the grinding time would be changed with respect to the grinding time corresponding to the dose just obtained. Obviously, at the end of each grinding operation, the weight of the dose obtained must be measured again (step 203) and compared again with the weight of the desired dose (204).

If the dose of ground coffee obtained has a weight greater than that of the set dose of ground coffee (220), the next dose will be obtained by suitably reducing the time (step 221). Preferably, at the end of each grinding step, the weight of the dose obtained must be measured again (step 203) and compared again with the weight of the desired dose (step 204).

If the dose of ground coffee obtained has a weight less than that of the set dose of ground coffee (230), the next dose will be obtained by suitably increasing the time (step 231). Preferably, at the end of each grinding step, the weight of the dose obtained (step 203) must be measured again and compared again with the weight of the desired dose (204).

In any case, the weight of one dose at the end of grinding is used to set the time for obtaining the next dose. The machine checks the weight and corrects the time continuously, after each grinding operation.

The weight of one dose, differently from that which occurs in known coffee grinding machines, is not used to stop the grinding process, but to obtain a following dose having a weight corresponding to the set dose.

Preferably, the coffee grinding machine comprises a memory with a relationship between weight of the dose and time. By way of example, the memory could contain information as shown in Table 2 below.

TABLE 2

| Default grinding time (seconds) | Weight (g) of the dose |
|---|---|
| 2.0 | 4-6 |
| 2.5 | 6-8 |
| 3.0 | 8-10 |
| 3.5 | 10-12 |
| 4.0 | 12-14 |
| 4.5 | 14-16 |
| 5.0 | 16-18 |
| 5.5 | 18-20 |
| 6.0 | 20-22 |

Compared to the coffee grinding machines with weight-based dosing (which slow down in order to obtain the dose in a precise manner) the machine according to the present invention is faster since it does not have to slow down.

The coffee grinding machine according to the invention is also less sensitive to disturbances. For example, a ground portion of 14 g requires about 5 seconds. During this time period, the counter, the coffee grinding machine or the portafilter must not receive knocks or impacts or be subject to vibrations in general. According to the present invention, the weighing time is reduced to only two moments: the initial moment for obtaining the tare weight and the final moment. Therefore, the system is exposed for a smaller amount of time to disturbing external stresses.

A further element which provides the machine according to the present invention with a greater degree of reliability consists in the fact that each single grinding step is determined by the number of revolutions (or, if appropriate, the time) and not by the weight. Therefore, should a disturbance be generated during that brief weighing instant, the dose would not be affected.

The reduced sensitivity to disturbances also results in an operating practice more in keeping with the current use. In fact it is common practice for the barista to move the portafilter during grinding so as to distribute the powder. With conventional systems this cannot be performed because it would alter the weight. Instead, in the system proposed the barista may move the portafilter as desired, except for an instant at the start and an instant at the end of grinding.

From the above description it clearly emerges that the present invention does not increase the repeatability of the dose of the coffee grinder. It is in reality a solution which allows a coffee grinding machine to maintain a "constant" dose (by weight) even when there is a variation in the particle size, environmental conditions which alter the behaviour of the coffee beans, frequency of use of the machine, type of coffee, or speed of rotation of the grinders.

The barista is able to perform more easily the operation of setting the coffee grinding machine. The barista must only deal with adjusting the particle size and not the quantity of ground coffee.

The invention claimed is:

1. A coffee grinding machine comprising a first grinder and a second grinder,
    wherein at least one of the first and second grinders is movable,
    wherein said grinders cooperate with each other based on a first grinding parameter so as to grind coffee beans, thus obtaining a first dose of ground coffee during a first grinding cycle,
    wherein said coffee grinding machine comprises a motor which is configured to rotate said second grinder with respect to the first grinder,
    wherein said coffee grinding machine also comprises a weighing device configured to measure the weight of said first dose of coffee inside a filter arranged in a portafilter, at the end of said first grinding cycle,
    wherein said weight measurement of said first dose measured at the end of said first grinding cycle is used to set a second grinding parameter of a second dose, which is ground after the first dose during a second grinding cycle, and
    wherein said coffee grinding machine is configured to interrupt the grinding of said second dose during said second grinding cycle in a manner not dependent on an actual weight measurement of said second dose.

2. The coffee grinding machine according to claim 1, wherein said motor (30) is configured to rotate said second grinder at a constant speed.

3. The coffee grinding machine according to claim 1, wherein said second grinding parameter is a number of revolutions of the motor for performing grinding of said second dose.

4. The coffee grinding machine according to claim 1, wherein said second grinding parameter is a grinding time for performing grinding of said second dose.

5. The coffee grinding machine according to claim 1, also comprising a frequency variator device for controlling the speed of rotation of the motor.

6. The coffee grinding machine according to claim 1, also comprising an angular position transducer, associated with the electric motor for measuring the rotation speed of the electric motor.

7. Coffee grinding machine according to claim 1, wherein the weighing device is separate from the machine body of said coffee grinding machine.

8. A method for grinding coffee beans between at least a first grinder and a second grinder, wherein at least one of the first and second grinders is movable, wherein said grinders cooperate with each other so as to grind coffee beans, thus obtaining a first dose of ground coffee during a first grinding cycle, the method comprising:
    rotating said second grinder with respect to the first grinder with a first grinding parameter,
    measuring the weight of said first dose of coffee contained inside a filter arranged in a portafilter at the end of said first grinding cycle,
    setting a second grinding parameter of a second dose, to be ground after the first dose during a second grinding cycle, based on said weight measurement of said first dose measured at the end of said first grinding cycle, and
    interrupting the grinding of said second dose during said second grinding cycle in a manner not dependent on an actual weight measurement of said second dose.

9. The method according to claim 8, wherein said step of moving at least one of the grinders with respect to the other one comprises the step of rotating said second grinder at a constant speed.

10. The method according to claim 8, wherein said second grinding parameter is a number of grinding revolutions and wherein said second grinder is rotated for said number of revolutions which is related to the weight of said first dose of coffee.

11. The method according to claim 8, wherein said second grinding parameter is a time and wherein said second grinder is rotated for said time which is related to the weight of said first dose of coffee.

* * * * *